(12) United States Patent
Heinonen et al.

(10) Patent No.: US 9,784,836 B2
(45) Date of Patent: Oct. 10, 2017

(54) SYSTEM FOR MONITORING POWER LINES

(71) Applicant: Sharper Shape Ltd., Helsinki (FI)

(72) Inventors: Tero Heinonen, Helsinki (FI); Juha Hyyppa, Espoo (FI); Anttoni Jaakkola, Espoo (FI)

(73) Assignee: Sharper Shape Oy, Helsink (FI)

( * ) Notice: Subject to any disclaimer, the term of this patent is extended or adjusted under 35 U.S.C. 154(b) by 429 days.

(21) Appl. No.: 14/534,728

(22) Filed: Nov. 6, 2014

(65) Prior Publication Data

US 2015/0131079 A1    May 14, 2015

Related U.S. Application Data

(60) Provisional application No. 61/901,489, filed on Nov. 8, 2013, provisional application No. 61/901,490, filed on Nov. 8, 2013, provisional application No. 61/901,492, filed on Nov. 8, 2013.

(51) Int. Cl.
*G01S 17/08* (2006.01)
*G01S 17/89* (2006.01)
*G06Q 10/06* (2012.01)
*G06Q 50/06* (2012.01)

(52) U.S. Cl.
CPC .............. *G01S 17/08* (2013.01); *G01S 17/89* (2013.01); *G06Q 10/0631* (2013.01); *G06Q 50/06* (2013.01)

(58) Field of Classification Search
CPC ....... B64C 19/00; B64C 29/00; B64C 39/024; B64C 2201/145; B64C 2201/024; B64D 47/08
See application file for complete search history.

(56) References Cited

U.S. PATENT DOCUMENTS

| | | | |
|---|---|---|---|
| 2010/0017046 A1* | 1/2010 | Cheung | G01S 7/003 701/2 |
| 2012/0200703 A1* | 8/2012 | Nadir | G02B 27/644 348/144 |
| 2014/0236390 A1* | 8/2014 | Mohamadi | B64C 19/00 701/2 |

* cited by examiner

*Primary Examiner* — Luke Ratcliffe
(74) *Attorney, Agent, or Firm* — Ziegler IP Law Group, LLC (57) ABSTRACT

Disclosed is a system for monitoring a power line. The system includes a ground unit and one or more airborne measurement devices for measuring distances between the power line and objects spatially located in proximities of the power line. Each of the one or more airborne measurement devices includes a computing hardware, one or more cameras for capturing images and a data memory for storing pattern-recognition software. The pattern-recognition software is executed on the computing hardware to process the images to identify a unique identifier attached to the ground unit. Each of the one or more airborne measurement devices maintains a line-of-sight with the ground unit during flight by tracking with computer vision the unique identifier attached to the ground unit.

10 Claims, 7 Drawing Sheets

SYSTEM FOR MONITORING POWER LINES

CROSS-REFERENCE TO RELATED APPLICATIONS

This application claims priority to and the benefit of U.S. provisional Patent Application No. 61/901,489, filed on 8 Nov. 2013 entitled System for Monitoring Power Lines; and is related to, and claims the benefit of U.S. Patent Application Ser. No. 61/901,490, filed on 8 Nov. 2013, entitled System and Method for Allocating Resources; and U.S. Patent Application Ser. No. 61/901,492 filed on 8 Nov. 2013 entitled System and Method for Reporting Events, the disclosures of which are incorporated herein by reference in their entirety.

TECHNICAL FIELD

The present disclosure relates generally to monitoring of power line networks, and more specifically, to systems for monitoring power lines, using unmanned aerial vehicles having different mapping sensors and possibly integrated with ground-based mobile mapping systems.

BACKGROUND

With incessant industrial development, an increasing number of power line networks are being set-up in rural as well as forest areas. These power line networks often include overhead power lines that need to be monitored from time to time to maintain adequate clearance between their energized conductors and the ground beneath the power lines. Moreover, it is desirable that the power line networks be resilient to storms, earthquakes and other potential causes of damage, so as to be able to meet increasing power demands at all times.

However, encroaching vegetation, such as a tree growing in proximity of a power line, pose potential threats to the power line. In one example, the tree might grow taller than the power line over a period of time. During a storm, the tree might fall over the power line, thereby breaking the power line and leading to a power failure. In another example, a branch of the tree might grow above the power line. During a snow fall, the branch might bend over the power line, due to heavy load of snow collected over the branch. This may lead to a problem in the power line, as the branch of the tree is in direct contact with the power line. Therefore, it is desirable that an accurate monitoring of the power line be performed from time to time, to mitigate risks posed by the encroaching vegetation and other objects, such as man-made structures and buildings.

Moreover, in case of a natural disaster, such as a major storm, a substantial amount of damage may occur to the power line. This may lead to massive disruption to power transmission and distribution. In such a case, a quick and accurate analysis of the damage is of utmost importance for power transmission and distribution operators, so as to enable them to manage repair work efficiently.

Traditionally, power lines have been monitored by on-site manual inspection. Such manual inspection often provides inaccurate results, as it is ground-based and is unable to cover upper structures of power pylons and/or crowns of trees. Moreover, manual inspection is expensive and time-consuming.

Some conventional systems for monitoring a power line network employ Light Detection And Ranging (LiDAR) system for generating three-dimensional models of the power line network and objects in a proximity of the power line network. A typical scanning LiDAR system consists of (1) a laser ranging unit (i.e. LiDAR) (2) an opto-mechanical scanner, (3) a position and orientation unit, and (4) a control, processing and storage unit. The laser ranging unit can be subdivided into a transmitter, a receiver, and the optics for both units. The receiver is a photodiode, which converts the incident power received by the detector to a current at the output. The receiver optics collects the backscattered light and focuses it onto the detector, which converts the photons to electrical impulses. The opto-mechanical scanning unit is responsible for the deflection of the transmitted laser beams across the flight path. The design of the deflection unit (e.g. oscillating mirror/zig-zag scanning, rotating mirror/line scanning, pushbroom/fiber scanning, Palmer/conical scanning) defines the scan pattern on the ground. A differential GNSS receiver provides the position of the laser ranging unit. Its orientation is determined by the pitch, roll, and heading of the aircraft, which are measured by an inertial navigation systems. Airborne LiDAR, i.e. Airborne Laser Scanning (ALS) is a method based on Light Detection and Ranging (LiDAR) measurements from an aircraft, where the precise position and orientation of the sensor is known, and therefore the position (x, y, z) of the reflecting objects can be determined. In addition to ALS, there is an increasing interest in Terrestrial Laser Scanning (TLS), where the laser scanner is mounted on a tripod or even on a moving platform, i.e. Mobile Laser Scanning (MLS)/Mobile LiDAR.

In one such conventional system, a helicopter is used to carry a LiDAR unit over the power line network. The LIDAR unit is operable to emit radiation beams that reflect from the objects and return to the LiDAR unit. For this purpose, the LiDAR unit may use ultraviolet, visible, or near infrared radiation. The LiDAR unit is then operable to measure a time taken by the emitted beams to return, and determine distances to the objects.

Additionally, an airborne system can also take digital images to which a photogrammetric process can be applied. The aim of photogrammetry is to make images measurable, i.e. to determine the position (X, Y, and Z) and the rotation angles (omega, phi, and kappa) of the camera, and to make measurements from the image. One of the most important applications of photogrammetry has been topographic mapping. The photogrammetric process from planning, image acquisition and orientation to 3D surface reconstruction has been nearly completely automated. Automatic digital image matching techniques (also called dense matching), such as cross correlation, SIFT, and Semi-Global Matching, are used or creating 3D models of the target area. However, the basic aim of photogrammetry is still the same that is, to determine the orientations of images and to make measurement (3D data) from the visible environment. Today photogrammetry can provide a point cloud having x, y, z coordinates similarly to LiDAR by using overlapping images and automated digital image matching processing.

However, the conventional systems suffer from several disadvantages. Firstly, a trained pilot is required to fly the helicopter over the power line network. Secondly, a human operator is required to operate the LiDAR unit from the helicopter. Thirdly, significant amount of fuel and time is consumed, making the whole system very expensive. Fourthly, in case of a major natural disaster, such as a thunder storm or a hurricane, the helicopter may be prevented from flying due to aviation regulations and safety.

This means that the conventional systems cannot be used at a time when LiDAR measurements are needed most urgently.

Therefore, there exists a need for a system for monitoring power lines that is capable of detecting potential threats to the power lines, even during a major natural disaster.

SUMMARY

The present disclosure seeks to provide a system for monitoring a power line.

In one aspect, embodiments of the present disclosure provide a system for monitoring a power line. The system includes a ground unit and one or more airborne measurement devices associated with the ground unit.

The ground unit includes mobile mapping systems, such as the scanning LiDAR, imaging systems, GNSS (Global Navigation Satellite System) receiver and IMU (Inertia Measurement Unit) to be able to collect georeferenced point clouds and images along the power line to be inspected. The use of mobile LiDAR (or Mobile Laser Scanning) for power monitoring includes the possibility to measure close-by trees, ground terrain models, poles and power lines from the close distance with high quality. Different platforms for the ground unit, such as skidoo, ATV and the like can be applied depending on the weather conditions. The airborne measurement devices are operable to measure distances between the power line and objects spatially located in proximities of the power line using both passive and active remote sensing techniques. Point clouds generation using dense matching techniques from overlapping digital images are one source of airborne data.

In an embodiment of the present disclosure, the airborne measurement devices provide the ground unit with the measured distances and other data collected by the airborne measurement device as a function of their aerial routes either in real-time, close to real time, or after landing. Accordingly, the ground unit may be operable to analyze the measured distances to identify potential threats to the power line. Additionally, the ground unit may be operable to generate one or more maps that are indicative of shapes and/or sizes of the objects spatially located in the proximities of the power line.

Moreover, each of the airborne measurement devices is capable of maintaining a line-of-sight with the ground unit during flight. In an embodiment of the present disclosure, each of the airborne measurement devices includes a computing hardware, one or more cameras for capturing images, and a data memory for storing a pattern-recognition software. When executed on the computing hardware, the pattern-recognition software is configured to process the images captured by the one or more cameras to identify one or more unique identifiers attached to the ground unit. This helps the airborne measurement device to stay in a line-of-sight with the ground unit, when that airborne measurement device is in flight.

The system is configured to combine use of Mobile LiDAR and use of visible, near-infrared, infrared and ultra-violet imaging systems such as still photography, video or high speed video camera from the UAV (unmanned aerial vehicle). This combined use allows the collection of images of tops of the poles for quality checking, and the position of tree tops from the images. Images can be converted to point clouds having x,y,z information using conventional dense-matching techniques. When these data is combined with Mobile LiDAR capable to extract the terrain model, position and alignment of trees, diameters, and stem curves of trees, species of trees, dead standing trees, poles, power lines, pylons, buildings and other manmade infrastructure, roads, and other potentially interfering objects, a complete inventory of the power line area can be conducted with this system. The UAV can land to the ground unit for the change of the battery, for getting more fuel, or to be replaced by another UAV. All data can be post-processed with high position accuracy in a typical LiDAR and image data mapping process and processed in real-time or near real-time either in the ground unit, in the UAV or processing divided to both ground unit and the UAV.

Beneficially, the unique identifiers may be asymmetrical. This may allow the airborne measurement devices to determine their respective positions relative to the ground unit.

The unique identifiers may be passive or active. Passive identifiers reflect external electromagnetic radiation such as light while active identifiers emit electromagnetic radiation using their own power source. This helps the identifiers to be identifiable remotely under any circumstances including during night, rain, and fog.

Moreover, the airborne measurement devices are beneficially implemented by way of Unmanned Aerial Vehicles (UAVs). Unlike manned aircraft, the UAVs can stay aloft for several hours, even during a major natural disaster, such as a thunder storm or a hurricane. Moreover, the UAVs are inexpensive and easy to operate, as compared to manned aircraft.

The airborne measurement devices may be controlled autonomously. Alternatively, the airborne measurement devices may be controlled semi-autonomously, for example, under a remote control of a pilot associated with the ground unit.

In another aspect, embodiments of the present disclosure provide an airborne measurement device for measuring distances between a power line and objects spatially located in proximities of the power line. The airborne measurement device includes a computing hardware, a communication interface, one or more cameras for capturing images and a data memory for storing a pattern-recognition software. The pattern-recognition software when executed on the computing hardware is configured to process the images to identify a unique identifier attached to a ground unit and to maintain a line-of-sight with the ground unit during flight by tracking the unique identifier.

In yet another aspect, embodiments of the present disclosure provide a method for monitoring a power line. The method includes measuring distances between the power line and objects spatially located in proximities of the power line with an airborne measurement device; capturing images of a ground unit to identify the ground unit; analysing the images and using the analysis to maintain line-of-sight between the airborne measurement device and the ground unit; and transmitting the measured distances to the ground unit.

Embodiments of the present disclosure substantially eliminate, or at least partially address the aforementioned problems in the prior art, and enable detection of potential threats to power lines, even during major natural disasters.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Embodiments of the present disclosure provide a system for monitoring a power line. The system includes a ground unit and one or more airborne measurement devices associated with the ground unit. The ground unit can include mobile mapping systems, such as the scanning LiDAR, imaging systems, digital cameras, spectrometers, thermal imaging systems, GNSS (Global Navigation Satellite System) receiver and IMU (Inertia Measurement Unit) to be able to collect data to generate georeferenced point clouds and images along the power line to be inspected. The georeferenced point clouds can be processed entirely or partly in a computing device of the ground unit. The use of mobile LiDAR (or Mobile Laser Scanning) for power monitoring includes the possibility to measure close-by trees, ground terrain models, poles and power lines from the close distance with high quality. Different platforms for the ground unit, such as skidoo, ATV, etc can be applied depending on the weather conditions. The airborne measurement devices are operable to measure distances between the power line and objects spatially located in proximities of the power line.

The system is configured to combine use of Mobile LiDAR and use of visible, near-infrared, infrared and ultraviolet imaging systems from the UAV. This combined use allows the collection of images of tops parts of poles for quality monitoring, and the position of tree tops from the images. When these data is combined with Mobile LiDAR capable to extract the terrain model, position of trees, diameters, and even stem curves of trees, position and size of poles, power lines, a complete inventory of the power line area can be conducted with this system. The knowledge of tree diameter and height can be used to estimate the possibility of the tree to fall towards power line in the future. Other advantages include the possibility to use cheap and low-weight UAV and cameras and low-cost close-range mobile LiDARs, and still the quality of the data is better than in all other airborne power line mapping techniques.

The processing include georeferencing of Mobile LiDAR data, and classification of points into e.g. terrain, trees trunks, other vegetation, poles, and power line classes. Images can be converted to point clouds having x,y,z information using conventional photogrammetric dense-matching techniques. The 3D model or virtual model of the power line area can be generated from these data.

The UAV can land to the ground unit for the change of the battery, for getting more fuel, or to be replaced by another UAV.

In an embodiment of the present disclosure, the airborne measurement devices provide the ground unit with the measured distances as a function of their aerial routes. Accordingly, the ground unit may be operable to analyze the measured distances to identify potential threats to the power line. Additionally, the ground unit may be operable to generate one or more maps that are indicative of shapes and/or sizes of the objects spatially located in the proximities of the power line.

Moreover, each of the airborne measurement devices is capable of maintaining a line-of-sight with the ground unit during flight. In an example embodiment, each of the airborne measurement devices includes a computing hardware, one or more cameras for capturing images, and a data memory for storing a pattern-recognition software. When executed on the computing hardware, the pattern-recognition software is configured to process the images captured by the one or more cameras to identify one or more unique identifiers attached to the ground unit. This helps the airborne measurement device to stay in a line-of-sight with the ground unit, when that airborne measurement device is in flight.

Beneficially, the unique identifiers may be asymmetrical. This may allow the airborne measurement devices to determine their respective positions relative to the ground unit.

Moreover, the airborne measurement devices are beneficially implemented by way of Unmanned Aerial Vehicles (UAVs). Unlike manned aircraft, the UAVs can stay aloft for several hours, even during a major natural disaster, such as a thunder storm or a hurricane. Moreover, the UAVs are inexpensive and easy to operate, as compared to manned aircraft.

The airborne measurement devices may be controlled autonomously. Alternatively, the airborne measurement devices may be controlled semi-autonomously, for example, under a remote control of a pilot associated with the ground unit.

Figure 1A:
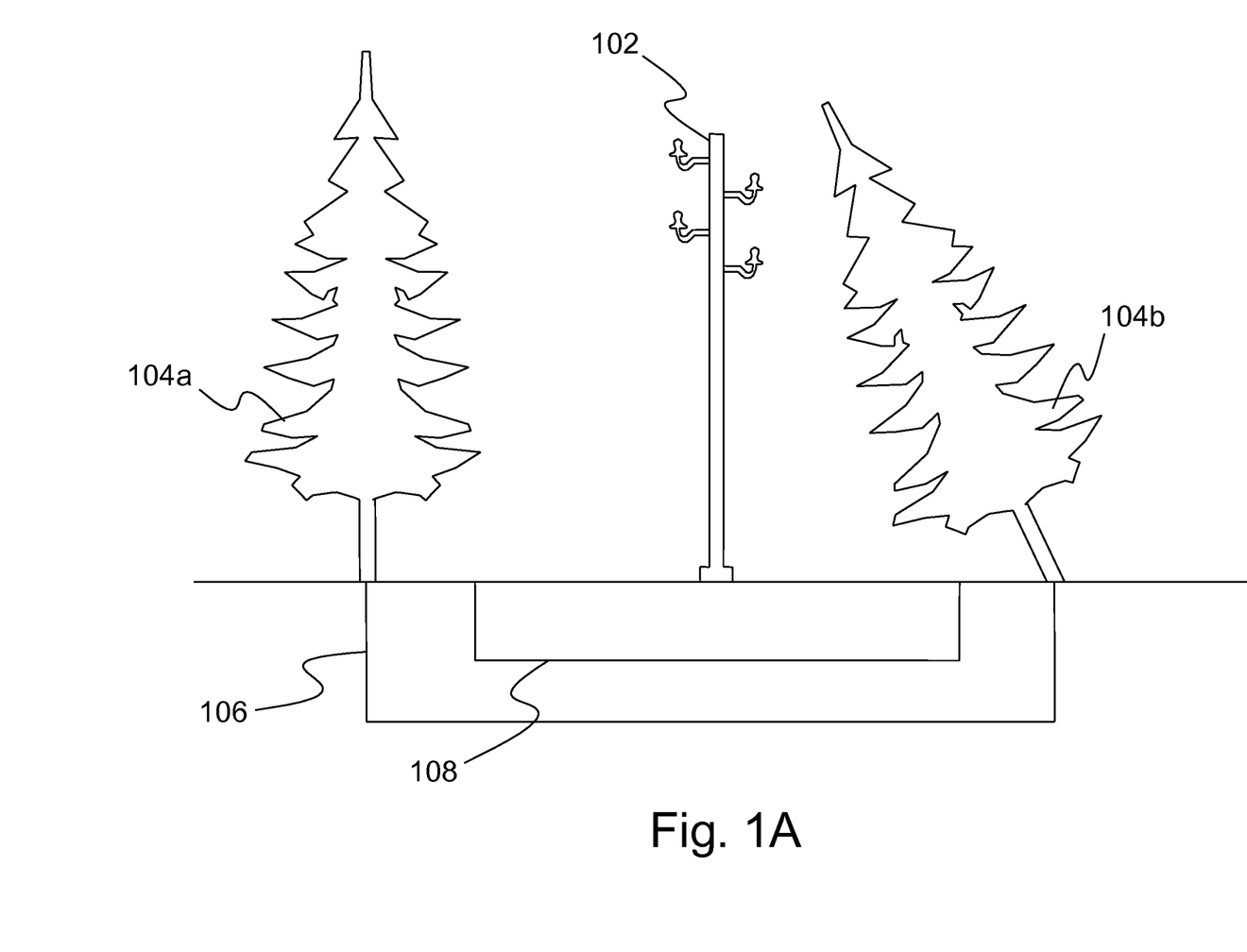
FIGS. 1A, 1B, 1C and 1D are illustrations of example vegetation that may be monitored to detect potential threats to a power line, in accordance with embodiments of the present disclosure.

Referring now to the drawings, particularly by their reference numbers, FIGS. 1A, 1B, 1C and 1D are illustrations of example vegetation that may be monitored to detect potential threats to a power line 102, in accordance with embodiments of the present disclosure. FIG. 1A shows trees 104a and 104b growing within an outer corridor area 106 with respect to the power line 102. With reference to FIG. 1A, the tree 104b is bent towards the power line 102, and its top portion lies within an inner corridor area 108 with respect to the power line 102. Consequently, the tree 104b poses an immediate threat to the power line 102.

The outer corridor area 106 and the inner corridor area 108 may be either user-defined or system-defined by default. In an example, a width of the outer corridor area 106 may range from 6 meters to 12 meters, while a width of the inner corridor area 108 may range from 4 meters to 10 meters.

Figure 1B:
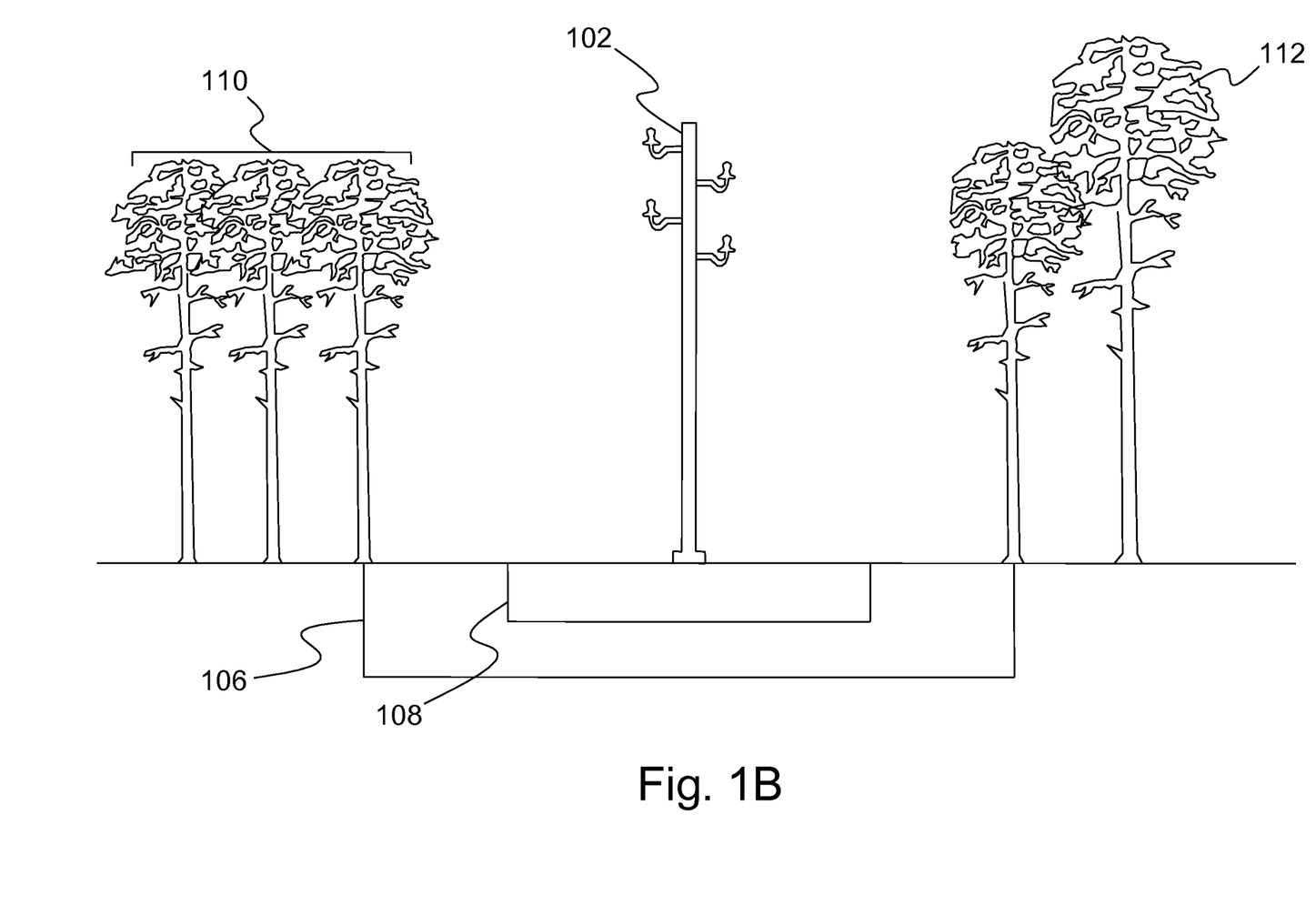

FIG. 1B shows a forest 110 of trees that are growing in proximity of the outer corridor area 106. With reference to FIG. 1B, the trees of the forest 110 are thin-tipped, and therefore, are prone to bend and incline towards the power line 102, for example, in a situation where a snow fall or a snow storm occurs. Consequently, these trees pose a potential threat to the power line 102.

Additionally, FIG. 1B shows a tree 112 that is growing outside the outer corridor area 106. A height of the tree 112 is greater than a height of the power line 102. Consequently, the tree 112 is prone to fall over the power line 102, and therefore, poses a potential threat to the power line 102.

Figure 1C:
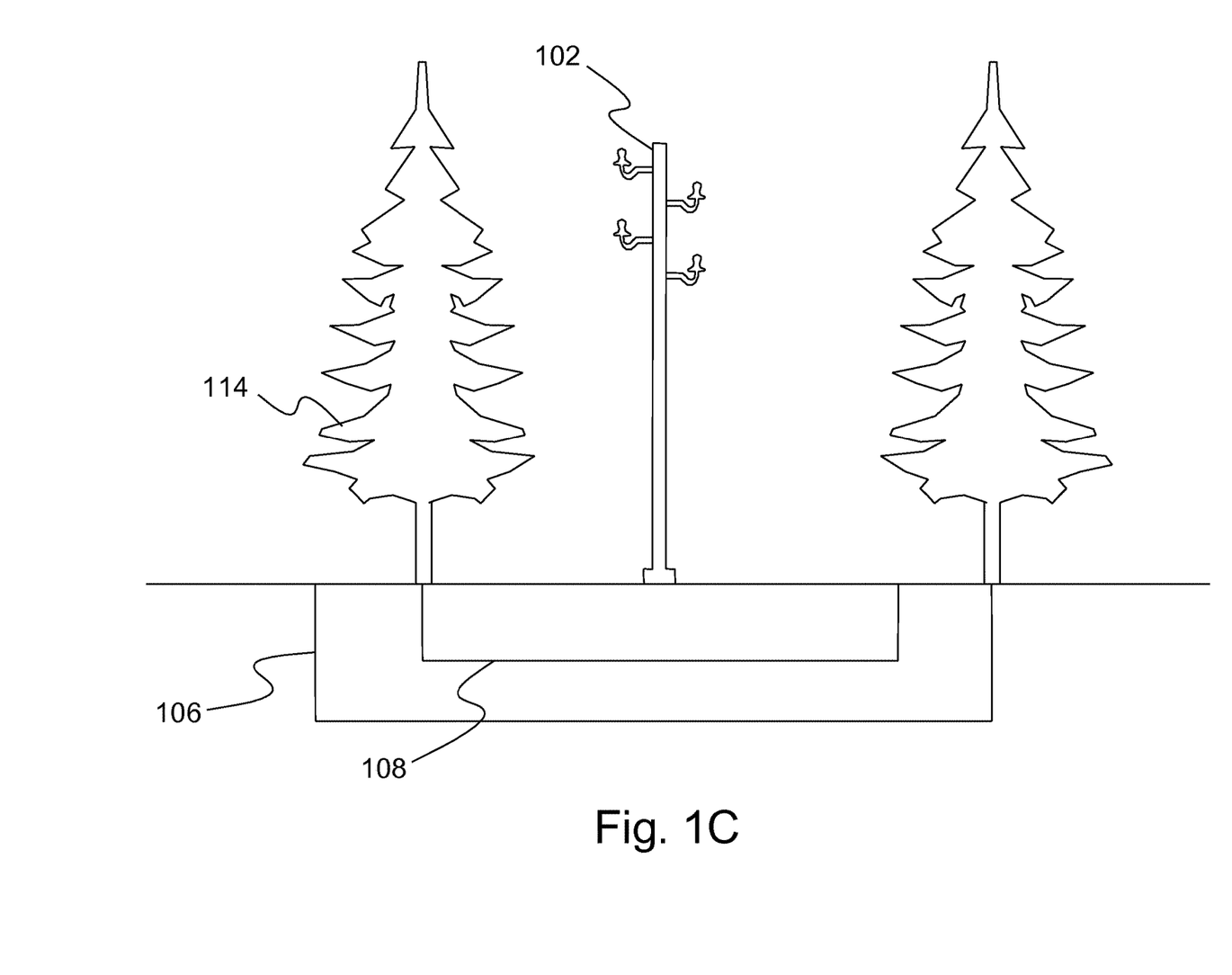

FIG. 1C shows a tree 114 that is growing within the inner corridor area 108. As the tree 114 grows, its branches reach closer to the power line 102. Therefore, the tree 114 poses a potential threat to the power line 102.

Figure 1D:
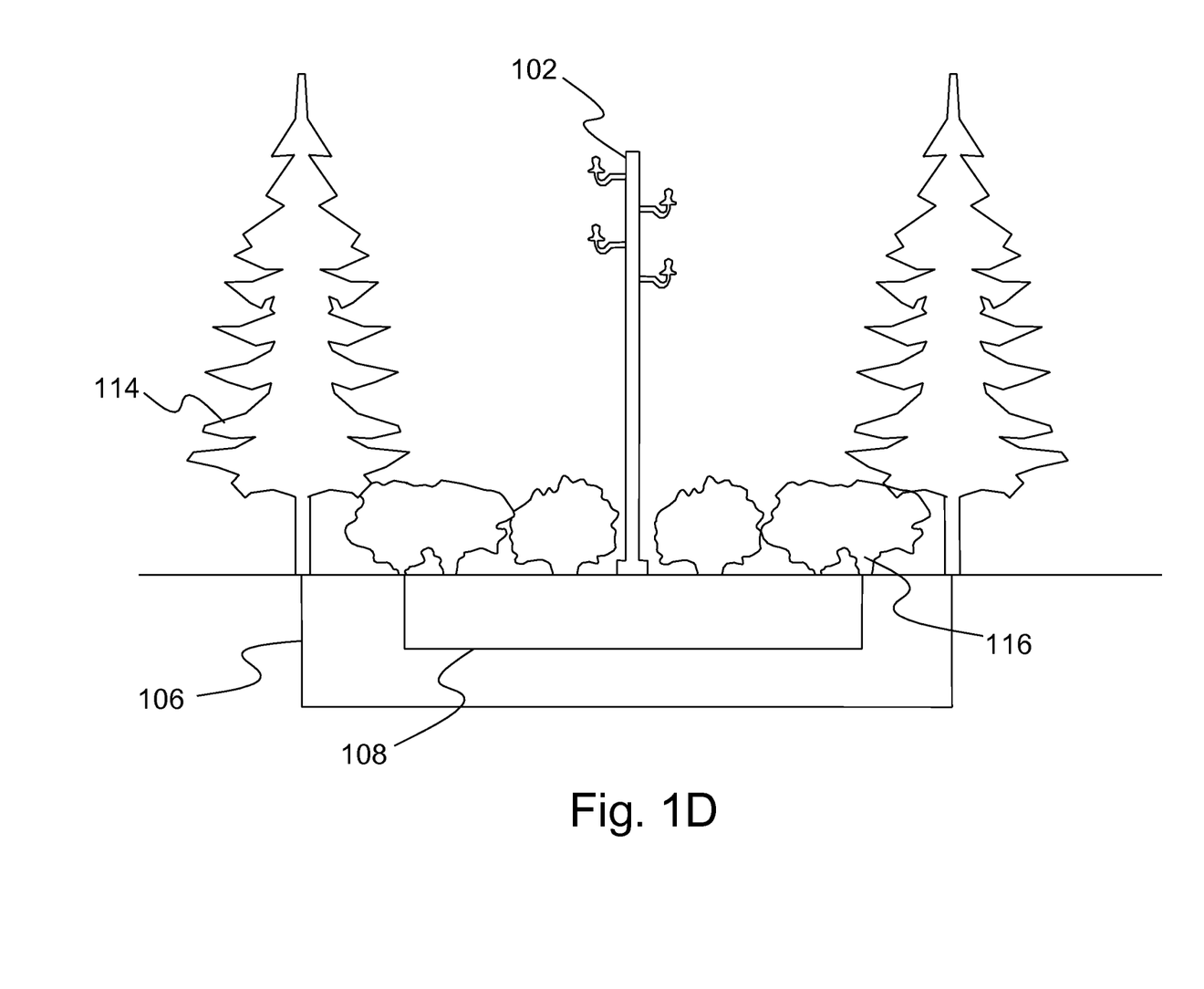

FIG. 1D shows ground vegetation 116 that is growing within the inner corridor area 108. The ground vegetation 116 may grow over a period of time, and reach closer to the power line 102. Consequently, the ground vegetation 116 poses a potential threat to the power line 102 at a later time.

FIGS. 1A, 1B, 1C and 1D are merely examples. A person skilled in the art will recognize many variations, alternatives, and modifications of embodiments of the present disclosure.

Figure 2:
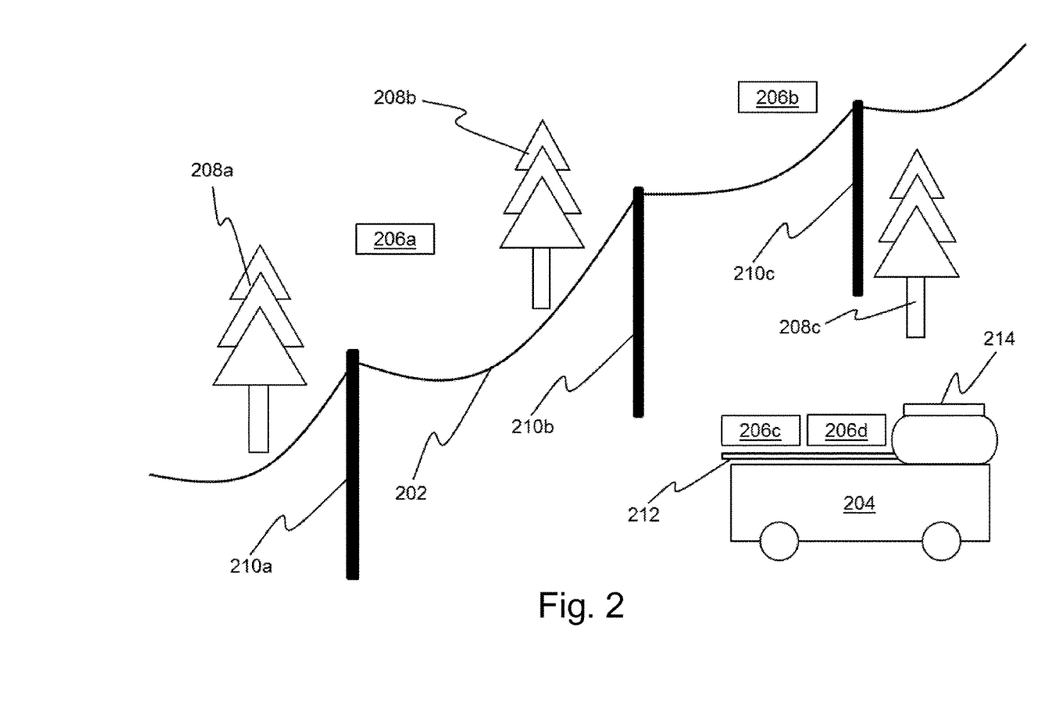
FIG. 2 is a schematic illustration of a system for monitoring a power line, in accordance with an embodiment of the present disclosure.

FIG. 2 is a schematic illustration of a system for monitoring a power line 202, in accordance with an embodiment of the present disclosure. The system includes a ground unit 204 and one or more airborne measurement devices, depicted as an airborne measurement device 206a, an airborne measurement device 206b, an airborne measurement device 206c and an airborne measurement device 206d in FIG. 2 (hereinafter collectively referred to as airborne measurement devices 206). The airborne measurement devices 206 are associated with the ground unit 204.

The airborne measurement devices 206 are operable to measure distances between the power line 202 and objects spatially located in proximities of the power line 202. With reference to FIG. 2, these objects include a tree 208a, a tree 208b and a tree 208c (hereinafter collectively referred to as trees 208) growing in the proximities of the power line 202.

In order to measure distances between the power line 202 and the trees 208, the airborne measurement devices 206 scan one or more corridor areas surrounding the power line 202. For this purpose, the airborne measurement devices 206 employ a suitable scanning mechanism, for example, such as Light Detection And Ranging (LiDAR), Synthetic-Aperture Radar (SAR), Infra-Red Thermography (IRT), X-ray radar, image and/or video cameras.

In an embodiment, the distances between the power line 202 and trees 208 spatially located in proximities of the power line 202 is measured by capturing aerial images with cameras of the airborne measurement devices 206. Further, the measurement of the distances between the power line 202 and trees 208 take into consideration a first point data generated with a LiDAR system attached to the airborne measurement devices 206. Also, the measurements of the distances consider a positioning data generated with a positioning system, of the airborne measurement device, configured to determine the location of the airborne measurement device 206. The airborne measurement devices 206 create a point cloud, i.e., images are converted to point clouds having x,y,z information using conventional dense-matching techniques. Further, positions and heights of the objects spatially located in proximity of the power line 202 are identified or obtained from the point cloud.

The power line 202 is supported by a plurality of poles, depicted as a pole 210a, a pole 210b and a pole 210c in FIG. 2. With reference to FIG. 2, the airborne measurement device 206a is scanning a corridor area between the poles 210a and 210b, while the airborne measurement device 206b is scanning a corridor area between the poles 210b and 210c.

In an embodiment of the present disclosure, the airborne measurement devices 206 provide the ground unit 204 with the measured distances as a function of their aerial routes. For example, the ground unit 204 includes at least one computing device (not shown in FIG. 2) for receiving information from the airborne measurement device 206. The ground unit 204 also includes a mobile LiDAR for generating a second point data. Further, the ground unit 204 includes a positioning system for determining the position of the ground unit 204.

In an example, the airborne measurement devices 206 may communicate the measured distances to the computing device spatially located within the ground unit 204, using a wireless communication link. This may allow the computing device to analyze the measured distances in real time or close to real time, for example, when the airborne measurement devices 206 are in flight. In an alternative example, the airborne measurement devices 206 may communicate the measured distances to the computing device when these airborne measurement devices 206 land on the ground unit 204.

Examples of the computing device include, but are not limited to, a smart telephone, a Mobile Internet Device (MID), a tablet computer, an Ultra-Mobile Personal Computer (UMPC), a phablet computer, a Personal Digital Assistant (PDA), a web pad, a Personal Computer (PC), a handheld PC, a laptop computer, and a large-sized touch screen with an embedded PC.

Upon receiving the measured distances from the airborne measurement devices 206, the computing device is optionally operable to analyze the measured distances to identify potential threats to the power line 202. Additionally, the computing device may be operable to generate one or more maps that are indicative of shapes and/or sizes of the objects spatially located in the proximities of the power line 202. In an embodiment of the present disclosure, the point cloud created with the airborne devices 206 is combined with the second point data from mobile LiDAR data measured with the ground unit 204. Further, positions and heights of the objects spatially located in proximity of the power line 202 are obtained from the combined point cloud.

In an embodiment of the present disclosure, the monitoring system is arranged in a manner that the analysis of the measured distances is implemented partly in the airborne measurement devices 206 and partly in the computing device of the ground unit 204.

Optionally, the computing device of the ground unit 204 may be operable to send the maps and/or results of the analysis to a remote server for further analysis. For example, the remote server may be operable to communicate with a weather forecast system to gather weather forecast information for one or more geographical regions from where the power line 202 passes. Subsequently, the remote server may be operable to take the weather forecast information into account while analyzing the maps received from the computing device of the ground unit 204. In this manner, the monitoring system is operable to identify potential threats to the power line 202.

Moreover, the airborne measurement devices 206 are beneficially implemented by way of Unmanned Aerial Vehicles (UAVs). Unlike manned aircraft, the UAVs can stay aloft for several hours, even during a major natural disaster, such as a thunder storm or a hurricane. Moreover, the UAVs are inexpensive and easy to operate, as compared to manned aircraft.

The airborne measurement devices 206 may be controlled autonomously. Alternatively, the airborne measurement devices 206 may be controlled semi-autonomously, for example, under a remote control of a pilot associated with the ground unit 204.

The ground unit 204 is beneficially arranged to be driven even in rough terrain, when required. Accordingly, the ground unit 204 is implemented by way of a Sport Utility Vehicle (SUV), a four-by-four vehicle, a Jeep®, a land rover, a van, a snow mobile, or an All-Terrain Vehicle (ATV).

With reference to FIG. 2, the airborne measurement devices 206c and 206d are landed on a landing platform 212 of the ground unit 204. Optionally, the landing platform 212 may be operable to recharge batteries of the airborne measurement devices 206c and 206d for their next flight. For this purpose, the landing platform 212 may employ inductive charging or wired charging. Alternatively, a human operator may replace discharged batteries of the airborne measurement devices 206c and 206d with charged batteries, when the airborne measurement devices 206c and 206d land on the landing platform 212. Yet alternatively, the airborne measurement devices 206c and 206d may use a carbon-based fuel, wherein the landing platform 212 may be used to refill the fuel in the airborne measurement devices 206c and 206d. Beneficially, such recharging, changing or refilling may be performed in a short period of time, in order to enable at least one of the airborne measurement devices 206 to be in flight constantly. This beneficially allows the monitoring system to monitor the power line 202 without any interruption.

Moreover, each of the airborne measurement devices 206 is capable of maintaining a line-of-sight with the ground unit 204 during flight. This facilitates safe operation of the airborne measurement devices 206 during flight. In a situation where several ground units and airborne measurement devices are employed, the airborne measurement devices may be operable to identify their respective dedicated ground units, and to stay visible from their respective ground units.

In an embodiment of the present disclosure, each of the airborne measurement devices 206 includes a computing hardware and a data memory for storing a pattern-recognition software. When executed on the computing hardware, the pattern-recognition software is configured to process the images captured by the one or more cameras to identify a unique identifier attached to the ground unit 204. This enables that airborne measurement device to stay in a line-of-sight with the ground unit 204 automatically, when that airborne measurement device is in flight.

The unique identifier may be visible, and may be made on a top surface 214 of the ground unit 204. The unique identifier may, for example, be a Quick Response (QR) code or a bar code that may be used to identify the ground unit 204 aerially.

The unique identifier may have a length and a breadth in a range of 50 to 150 cm. In a situation where the airborne measurement devices 206 have knowledge of dimensions of the unique identifier, the airborne measurement devices 206 may be operable to determine their respective altitudes relative to the ground unit 204.

Beneficially, the unique identifier may be asymmetrical. This may allow the airborne measurement devices 206 to determine their respective positions relative to the ground unit 204.

The unique identifiers may be passive or active. Passive identifiers reflect external electromagnetic radiation such as light while active identifiers emit electromagnetic radiation using their own power source. This helps the identifiers to be identifiable remotely under any circumstances including during night, rain, and fog. For example a Quick Response (QR) code identifier may be illuminated by a light source attached to the ground unit 204. In another embodiment of the present disclosure, each of the airborne measurement devices 206 includes a radio frequency transceiver that is operable to transmit and receive radio signals to and from a radio frequency transceiver of the ground unit 204. These radio frequency transceivers may operate at a suitable frequency band, such as 27 MHz, 35 MHz, 40 MHz, 1.3 GHz, 2.4 GHz, 4.9 GHz or 5 GHz frequency bands, depending on local radio frequency regulations for aerial vehicles. The airborne measurement devices 206 may be operable to determine their respective altitudes relative to the ground unit 204, for example, using received signal Time-of-Flight (ToF) measurements or Received Signal Strength Indicator (RSSI) measurements. The airborne measurement devices 206 may also be operable to determine their respective positions relative to the ground unit 204, for example, using information about angles at which the radio signals are transmitted and received.

FIG. 2 is merely an example. It is to be understood that the specific designation for the monitoring system is provided as an example and is not to be construed as limiting the monitoring system to specific numbers, types, or arrangements of ground units and airborne measurement devices. A person skilled in the art will recognize many variations, alternatives, and modifications of embodiments of the present disclosure.

Figure 3A:
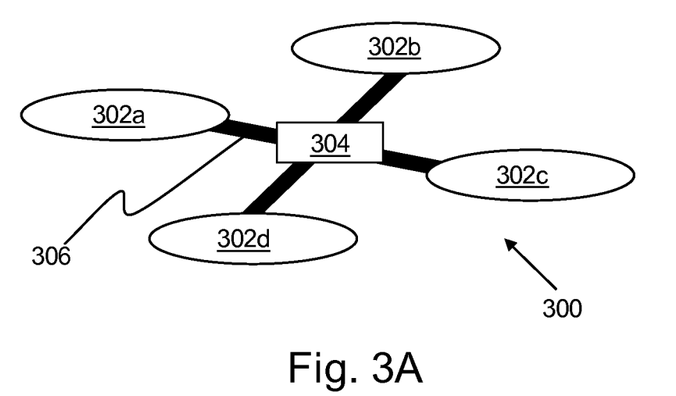
FIGS. 3A and 3B are schematic illustrations of various components of an airborne measurement device, in accordance with an embodiment of the present disclosure.
Figure 3B:
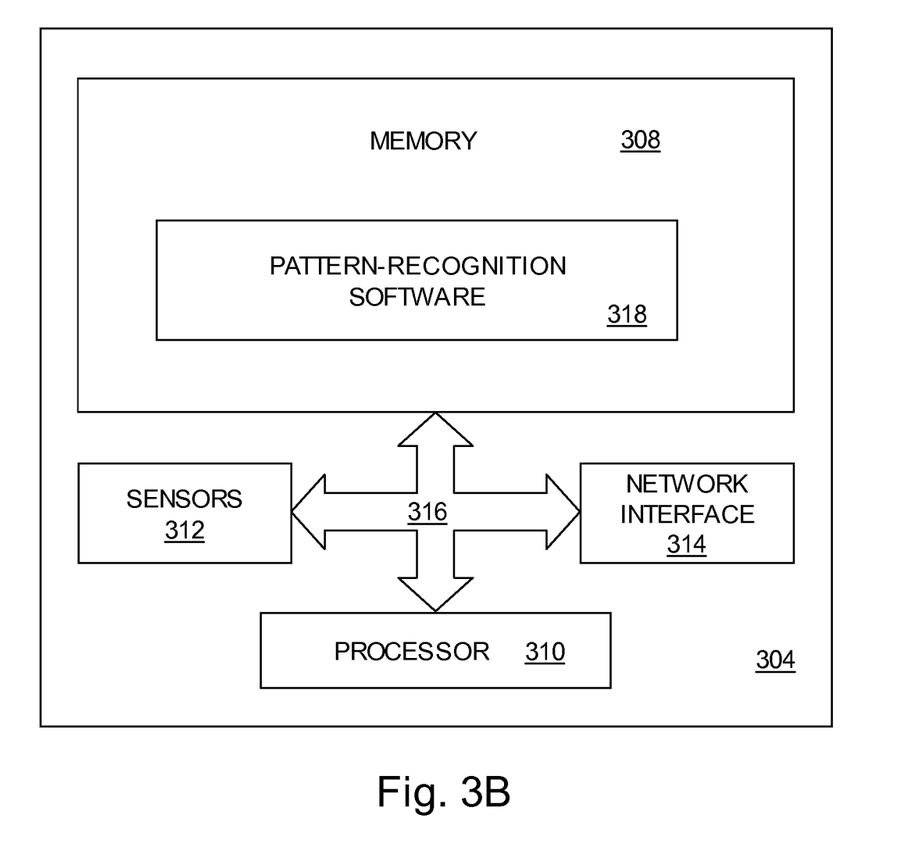

FIGS. 3A and 3B are schematic illustrations of various components of an airborne measurement device 300, in accordance with an embodiment of the present disclosure. The airborne measurement device 300 includes one or more propellers, depicted as a propeller 302a, a propeller 302b, a propeller 302c and a propeller 302d in FIG. 3A (hereinafter collectively referred to as propellers 302). Each propeller includes its associated motor unit for driving that propeller.

The airborne measurement device 300 also includes a main unit 304 that is attached to the propellers 302 by arms 306. The main unit 304 includes a power source (not shown in FIGS. 3A and 3B) for supplying electrical power to the various components of the airborne measurement device 300, namely, the propellers 302 and various sub-components of the main unit 304. In an embodiment of the present disclosure, the power source includes a rechargeable battery, such as a Lithium-ion battery. As described earlier, the battery may be recharged or changed, when the airborne measurement device 300 lands on the landing platform 212 of the ground unit 204.

Referring now to FIG. 3B, the main unit 304 includes, but is not limited to, a data memory 308, a computing hardware such as a processor 310, a configuration of sensors 312, a network interface 314, and a system bus 316 that operatively couples various components including the data memory 308, the processor 310, the sensors 312 and the network interface 314.

The data memory 308 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

The sensors 312 may, for example, include one or more of: a LiDAR sensor, a SAR sensor, a thermal camera, an image camera, a video camera, an Inertial Measurement Unit (IMU) sensor, a Global Satellite Navigation System (GNSS) sensor, an altitude meter, a Hall effect sensor, an Electro-Magnetic Field (EMF) sensor, a magnetometer, an accelerometer, and/or a gyroscopic sensor.

In an embodiment of the present disclosure, the sensors 312 include a LiDAR sensor that is operable to scan surroundings of the airborne measurement device 300. In an alternative embodiment of the present disclosure, the sensors 312 include a SAR sensor or a thermal camera, instead of the LiDAR sensor, for scanning the surroundings of the airborne measurement device 300.

The LiDAR sensor is operable to emit radiation that reflects from the objects and returns to the LiDAR sensor. For this purpose, the LiDAR sensor may use ultraviolet, visible, or near infrared radiation. The LiDAR sensor is then operable to measure a time taken by the emitted beams to return, and to determine distances to the objects. Based upon the determined distances, the LiDAR sensor is operable to measure distances between the power line 202 and the objects spatially located in the proximities of the power line 202. As described earlier, the measured distances may be recorded as a function of an aerial route taken by the airborne measurement device 300.

Subsequently, the main unit 304 is operable to send the measured distances to the ground unit 204 via a wireless communication link provided by the network interface 314. This may be particularly beneficial during an emergency, such as an approaching, ongoing or distancing storm to analyse the damage caused to the power line. Alternatively, the measured distances may be stored in the data memory 308 of the main unit 304, and may be downloaded to the computing device of the ground unit 204 when the airborne measurement device 300 lands on the ground unit 204.

As described earlier, the measured distances may be analyzed at least partially by the main unit 304 to generate one or more maps indicative of the shapes and/or sizes of the objects spatially located in the proximities of the power line 202. Additionally, the measured distances may be analyzed by the computing device of the ground unit 204 to identify potential threats to the power line 202. For example, as described earlier, the point cloud created with the airborne devices 206 is combined with the second point data from mobile LiDAR data measured with the ground unit 204. Thus, positions and heights of the objects spatially located in proximity of the power line 202 are obtained from the combined point cloud.

In an embodiment of the present disclosure, the sensors 312 include, inter alia, an EMF sensor and/or a Hall effect sensor that are operable to measure and detect proximity of the airborne measurement device 300 to the power line 202.

In a situation where a strength of an electromagnetic field and/or a magnetic field is greater than or equal to a threshold value, the airborne measurement device 300 is configured to increase or decrease its altitude, for example, depending on a direction in which it has been flying. This enables the airborne measurement device 300 to control its flight autonomously, while staying at a safe distance from the power line 202.

Additionally, the EMF sensors and/or the Hall effect sensors can be used to detect directions and gradients of the electromagnetic fields. The airborne measurement device 300 may then analyze information pertaining to the electromagnetic fields, to determine a direction in which the airborne measurement device 300 has been flying with respect to the power line 202.

Furthermore, the sensors 312 may also include an IMU sensor for manoeuvring the airborne measurement device 300 when in flight.

Additionally, the sensors 312 may include a Global Positioning System (GPS) or other Global Satellite Navigation System (GNSS) sensor for determining one or more absolute spatial locations of the airborne measurement device 300 upon a surface of the Earth.

In an embodiment of the present disclosure, the sensors 312 include one or more cameras for capturing images of ground vegetation and/or the ground unit 204 when the airborne measurement device 300 is in flight.

As described earlier, the data memory 308 stores a pattern-recognition software 318 that, when executed on the processor 310, is configured to process the images captured by the cameras to identify one or more unique identifiers attached to the ground unit 204. These unique identifiers enable the airborne measurement device 300 to adjust its aerial position, such that it stays in a line-of-sight with the ground unit 204 automatically.

These unique identifiers may be visible, and may be made on the top surface 214 and/or side surfaces of the ground unit 204. The unique identifiers may, for example, be QR codes or bar codes that may be used to identify the ground unit 204 aerially.

Beneficially, the airborne measurement device 300 has knowledge of dimensions of the unique identifiers. This enables the airborne measurement device 300 to determine its altitude relative to the ground unit 204.

Optionally, the unique identifiers may be asymmetrical. Alternatively, two different identifiers may be made on the two side surfaces of the ground unit 204. This may allow the airborne measurement device 300 to determine its position relative to the ground unit 204.

In another embodiment of the present disclosure, the sensors 312 include a radio frequency transceiver that is operable to transmit and receive radio signals to and from the radio frequency transceiver of the ground unit 204. These radio frequency transceivers may be operated to enable the airborne measurement device 300 to stay in a line-of-sight with the ground unit 204.

Additionally, the airborne measurement device 300 may be operable to determine its altitude relative to the ground unit 204, for example, using received signal ToF measurements or RSSI measurements. The airborne measurement device 300 may also be operable to determine its position relative to the ground unit 204, for example, using information about angles at which the radio signals are transmitted and received.

While staying in a line-of-sight with the ground unit 204, the airborne measurement device 300 may follow an aerial route that enables it to scan surroundings of a portion of the power line 202 spatially located in a proximity of the ground unit 204.

In accordance with an embodiment of the present disclosure, the airborne measurement device 300 is configured to follow a pre-defined aerial route while staying in a line-of-sight with the ground unit 204. In an example, the pre-defined aerial route may be defined with respect to a current spatial location of the ground unit 204. The ground unit 204 may stand still or be driven from time to time, while the airborne measurement device 300 is in flight.

FIGS. 3A and 3B are merely examples. It is to be understood that the specific designation for the airborne measurement device 300 is provided as an example and is not to be construed as limiting the airborne measurement device 300 to specific numbers, types, or arrangements of modules and/or components of the airborne measurement device 300. A person skilled in the art will recognize many variations, alternatives, and modifications of embodiments of the present disclosure. For example, the airborne measurement device 300 could be implemented as the airborne measurement devices 206, and vice versa. It is to be noted here that the airborne measurement device 300 and/or the airborne measurement devices 206 may be implemented by way of fixed-wing aircrafts, multi-copters, or harriers.

Figure 4:
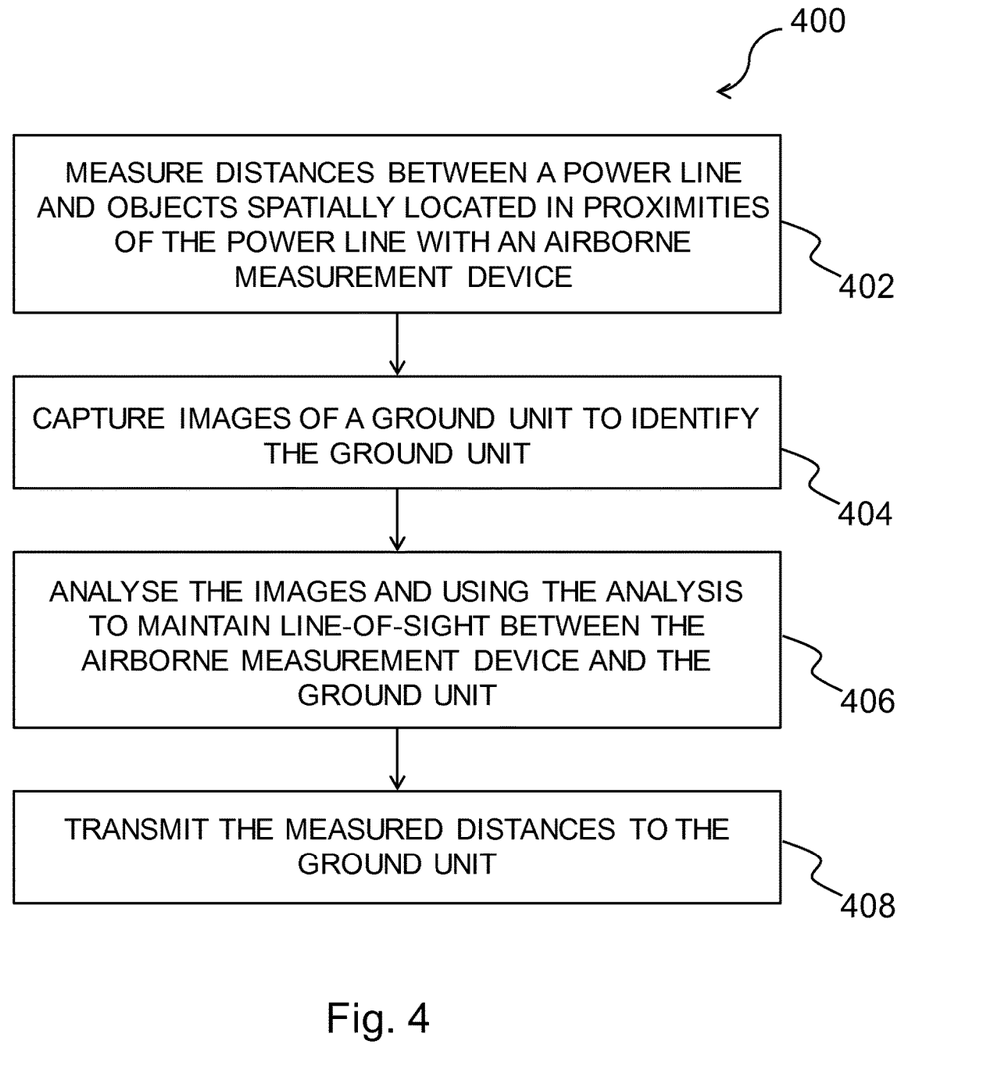
FIG. 4 is an illustration of steps of a method for monitoring a power line, in accordance with an embodiment of the present disclosure.

Referring now to FIG. 4, a method 400 for monitoring a power line, in accordance with an embodiment of the present disclosure.

At step 402, distances between the power line and objects spatially located in proximities of the power line is measured with an airborne measurement device. As explained above, the distances between the power line and objects spatially located in proximities of the power line is measured by capturing aerial images with cameras of the airborne measurement device. Further, the measurement of the distances between the power line and objects considers a first point data generated with a LiDAR system attached to the airborne measurement device. Also, the measurement of the distances considers a positioning data generated with a positioning system of the airborne measurement device.

At step 404, images of a ground unit is captured to identify the ground unit. For example, the cameras of the airborne measurement device capture the images of the ground unit.

At step 406, the images are analyzed to maintain a line-of-sight between the airborne measurement device and the ground unit. As explained above, a pattern-recognition software that, when executed on a computing hardware of the airborne measurement device, is configured to process the images to identify a unique identifier attached to the ground unit. This enables in maintaining the line-of-sight between the airborne measurement device and the ground unit.

At step 408, the measured distances are transmitted to the ground unit. For example, the method 400 measures a position of a top part of spatially located objects from the captured aerial images. Further, the method 400 includes creating a point cloud from aerial imagery captured by the one or more airborne measurement device. Moreover, the method 400 combines the said point cloud with a second point data from mobile a LiDAR system of the ground unit to form combined point cloud. Finally, the method 400 determines the location and height of the spatially located objects from the combined point cloud. In an embodiment, the objects spatially located in proximities of the power line includes but not limited trees.

The steps 402 to 408 are only illustrative and other alternatives can also be provided where one or more steps are added, one or more steps are removed, or one or more steps are provided in a different sequence without departing from the scope of the claims herein.

Embodiments of the present disclosure are susceptible to being used for various purposes, including, though not limited to, enabling detection of potential threats to power lines, even during major natural disasters.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

We claim:

1. A system for monitoring a power line, the system comprising:
a ground unit; and
one or more airborne measurement devices for measuring distances between the power line and objects spatially located in proximities of the power line, each of the one or more airborne measurement devices comprising:
a computing hardware;
one or more cameras for capturing images; and
a data memory for storing a pattern-recognition software that, when executed on the computing hardware, is configured to process the images to identify a unique identifier attached to the ground unit;
wherein each of the one or more airborne measurement devices maintains a line-of-sight with the ground unit during flight by tracking with computer vision the unique identifier attached to the ground unit; and
wherein the one or more airborne measurement devices is used to create a point cloud and positions and heights of the objects spatially located in proximity of the power line are obtained from the said point cloud.

2. The system of claim 1, wherein each of the one or more airborne measurement devices further comprises a Light Detection And Ranging (LiDAR) system for generating a first point data and a positioning system for determining the location of the airborne measurement device.

3. The system of claim 1, wherein the ground unit comprises at least one computing device for receiving information from the airborne measurement device, a mobile LiDAR for generating a second point data, a positioning system for determining the position of the ground unit and a landing platform for the one or more airborne measurement device.

4. The system of claim 1, wherein a point cloud created with the one or more airborne devices is combined with a second point data from mobile LiDAR data measured with the ground unit; and positions and heights of the objects spatially located in proximity of the power line are obtained from the combined point cloud.

5. The system of claim 4, wherein the objects spatially located in proximity of the power line are trees.

6. The system of claim 1, wherein the unique identifier is asymmetrical.

7. A method for monitoring a power line, the method comprising steps of:

measuring distances between the power line and objects spatially located in proximities of the power line with an airborne measurement device;

capturing images of a ground unit to identify the ground unit;

analysing the images and using the analysis to maintain line-of-sight between the airborne measurement device and the ground unit;

transmitting the measured distances to the ground unit; and measuring a position of a top part of spatially located objects from the captured aerial images;

creating a point cloud from aerial imagery captured by the one or more airborne measurement device;

combining the said point cloud with a second point data from mobile a LiDAR system of the ground unit to form combined point cloud; and determining the location and height of the spatially located objects from the combined point cloud.

8. The method of claim 7, wherein the step of measuring distances comprises steps of:

capturing aerial images;

generating a first point data with a LiDAR system; and generating a positioning data with a positioning system.

9. The method of claim 7, wherein the objects spatially located in proximities of the power line are trees.

10. An airborne measurement device for measuring distances between a power line and objects spatially located in proximities of the power line, comprising:

a computing hardware;

a communication interface;

one or more cameras for capturing images; and a data memory for storing a pattern-recognition software that, when executed on the computing hardware, is configured to process the images to identify a unique identifier attached to a ground unit and to maintain a line-of-sight with the ground unit during flight by tracking the unique identifier;

wherein the airborne measurement device is used to create a point cloud and positions and heights of the objects spatially located in proximity of the power line are obtained from the said point cloud.

* * * * *